United States Patent Office 3,099,680
Patented July 30, 1963

3,099,680
PROCESS FOR THE MANUFACTURE OF 1,2-DICYANO CYCLOBUTANE
Kurt Sennewald and Armin Götz, Knapsack, near Cologne, and Gottfried Kallrath, Kerpen, near Cologne, Germany, assignors to Knapsack-Griesheim Aktiengesellschaft, Knapsack, near Cologne, Germany, a corporation of Germany
No Drawing. Filed Jan. 16, 1961, Ser. No. 82,703
Claims priority, application Germany Jan. 23, 1960
3 Claims. (Cl. 260—464)

The present invention relates to a process for the manufacture of 1,2-disubstituted cyclobutane compounds by thermal dimerization of acrylic compounds, and more especially to a process for the manufacture of 1,2-dicyanocyclobutane from acrylonitrile, wherein the acrylic compound is heated under inert gas pressure for a period of up to 6 hours in the presence of definite catalysts, and subsequently the unreacted starting product is distilled off.

Our copending application Serial No. 3,244, filed January 19, 1960, describes a process for the manufacture of 1,2-disubstituted cyclobutane compounds by thermal dimerization of acrylic compounds, wherein the acrylic compound is heated for a period of up to approximately 6 hours in the presence of an oxygen compound of nitrogen, sulfur or carbon in which compound the elements do not appear in their maximum valency, or in the presence of a compound evolving such an oxygen compound, and under the pressure of an inert gas, and the unreacted portion of the starting compound is removed by distillation. By this process 1,2-disubstituted cyclobutane compounds which are free from higher polymers can be obtained in good yields.

It is especially advantageous to use acrylonitrile which yields 1,2-dicyanocyclobutane. The heat treatment is carried out preferably for a period of between about 1 hour to 2 hours under a pressure of between about 10 and 100 atmospheres, preferably about 20 and 50 atmospheres gauge and at a temperature of between about 180° C. and 260° C., advantageously about 230° C. and 250° C. The substances added (oxygen compounds) can be gaseous under normal conditions or evolve gases upon being heated under the reaction conditions. Alternatively, the substances added (oxygen compounds) may be in the liquid or solid state under normal conditions and may have a relatively high vapor pressure. There may be used more especially NO (nitrogen monoxide), CO (carbon monoxide) and $SO_2$ (sulfur dioxide), or substances evolving these gases. There may be used, for example, diphenylnitrosamine, nickel tetracarbonyl or analogous substances. The substances to be added to the reaction mixture are used in a proportion of about 0.01 to 1.00% by weight, advantageously about 0.05 to 0.1% by weight, calculated on the acrylic compound used. Suitable inert gases are nitrogen, hydrogen, argon, or the like. The reaction mixture obtained is worked up by distillation, whereupon the unreacted portion of the acrylic compound is again cycled to participate in the dimerization, while the reaction product is worked up by distillation in vacuo and obtained in pure form.

Now, it has surprisingly been found that the process for the manufacture of 1,2-disubstituted cyclobutane compounds by thermal dimerization of acrylic compounds, and especially for the manufacture of 1,2-dicyanocyclobutane from acrylonitrile, wherein the acrylic compound is heated for a period of up to 6 hours in the presence of definite catalysts and under the pressure of an inert gas, and the unreacted portion of the starting product is removed by distillation, can also be carried out in the same manner using as catalysts sulfur compounds of the formulae $R_1$—S—$R_2$ and S=$R_3$ in which $R_1$ and $R_2$ stand for hydrogen and/or an alkyl radical and/or a metal of groups II to VIII of the periodic table, and $R_3$ represents an organic radical attached to the sulfur atom with a double bond via a carbon atom.

The heat treatment is likewise carried out under a pressure of between about 10 and 100 atmospheres and preferably about 20 and 50 atmospheres gauge, and at a temperature of between about 180° and 260° C., advantageously about 230° C. and 250° C.

The substances added should be advantageously in the gaseous state under normal conditions or evolve gases upon being heated under the reaction conditions. Alternatively, the substances to be added may be in the liquid or solid state under normal conditions and may have a relatively high vapor pressure.

In the process of this invention there may be used more especially $H_2S$, alkylmercaptans, and dialkylsulfides. Likewise suitable are NiS, $WS_2$, CoS, FeS, BaS, ZnS and corresponding metal compounds. Furthermore there may be used dimethyl sulfoxide which yields formaldehyde and mercaptan on being heated. Further suitable compounds are thioacetamide, allyl isothiocyanate or analogous substances.

It appears important to use the catalytically active compounds in gaseous or vaporous form, in other words, it is advantageous to use gases or substances which evolve gases on being decomposed, or substances of which the vapor pressure is sufficiently high to ensure that a certain amount of vaporous substance is present in the inert ags under the reaction conditions. When metal sulfides are used other reasons will be responsible for the catalytic action.

Seen from another angle, it may be more appropriate to replace the term "catalyst" by "inhibitor" in view of the fact that the substances added actually inhibit further polymerization, for example of acrylonitrile, and so permit, above all, dimerization.

The substances to be added to the reaction mixture are used in a proportion of about 0.01 to 1.00% by weight and preferably about 0.05 to 0.1% by weight, calculated on the acrylic compound used.

Suitable inert gases are, for example, nitrogen, hydrogen, argon or a similar gas. According to a further feature of the invention, the reaction mixture obtained is worked up by distillation, the unreacted portion of the acrylic compound is again cycled to participate in the dimerization, while the reaction product is worked up by distillation in vacuo and obtained in pure form.

The following examples serve to illustrate the invention but they are not intended to limit it thereto.

*Example 1*

A 5 liter autoclave of stainless steel was charged with 2 kilograms acrylonitrile and about 0.05% by weight $H_2S$ were subsequently introduced while stirring. The air in the autoclave was replaced by nitrogen, the autoclave was closed and slowly heated to 250° C. while stirring was continued. The pressure in the autoclave rose to about 50 atmospheres gauge. After about two hours the reaction mixture was cooled to room temperature and the pressure was released. A light yellow liquid was obtained from which the unreacted portion of acrylonitrile (about 85%) was removed by distillation and recycled into the autoclave, while the 1,2-dicyanocyclobutane was obtained as cis-trans mixture in the form of a whitish pasty product from the reaction mixture by distillation in vacuo at a pressure of about 3 mm. of mercury. In one passage the conversion thus amounted to about 15%, calculated on the acrylonitrile used. The yield was about 70%, calculated on the acrylonitrile which underwent reaction.

Example 2

1 cc. dodecylmercaptan was added to 2 kilograms acrylonitrile. The acrylonitrile thus stabilized was heated for 2 hours at 240° C. after the pressure had been brought to 10 atmospheres gauge by means of hydrogen. After cooling and pressure release, a yellow liquid was obtained in the autoclave. With a conversion of 16% and a yield of 87% a cis-trans mixture of 1,2-dicyanocyclobutane was obtained from said liquid. The yield is calculated on the reacted amount of acrylonitrile while the conversion relates to the originally used amount of acrylonitrile.

Example 3

1.5 grams β,β'-dicyanodiethylsulfide were added to 2 kilograms acrylonitrile. As inert gas nitrogen was added until a pressure of 10 atmospheres was reached, and the reaction mixture was heated for 2 hours at 240° C. After cooling a yield of 82% of 1,2-dicyanocyclobutane was obtained with a conversion of 17%, the yield being calculated on the reacted amount of acrylonitrile.

Example 4

0.01 to 1% by weight, NiS, $WS_2$, CoS, FeS, MaS or ZnS were added to or introduced by stirring into 2 kilograms acrylonitrile. Hydrogen was used as inert gas and the mixture was stirred for 1 to 2 hours at 240° C. under a pressure of 50 atmospheres. With an average conversion of about 12% a cis-trans-mixture of 1,2-dicyanocyclobutane was obtained in each case in a yield of about 85%.

Example 5

Under a pressure of an inert gas of about 10 atmospheres gauge and while stirring at 240° C., 2 kilograms acrylonitrile containing about 0.1% by weight dimethylsulfoxide were thermally dimerized and the reaction product was worked up as described in the preceding examples. With a conversion of 18.5% 1,2-dicyanocyclobutane was obtained in a yield of 85%.

Example 6

Under a pressure of hydrogen of about 100 atmospheres and while stirring at 240° C., 2 kilograms acrylonitrile containing about 0.01% by weight thioacetamide were thermally dimerized. The reaction product was worked up as described in the preceding examples. 15% of the acrylonitrile underwent reaction and 1,2-dicyanocyclobutane was obtained in a yield of 80%.

Example 7

Under a hydrogen pressure of about 40 atmospheres and while stirring at 240° C., 2 kilograms acrylonitrile containing about 0.1% by weight allyl isothiocyanate were thermally dimerized and the reaction product was worked up as described above. 11% of the acrylonitrile underwent reaction and 1,2-dicyanocyclobutane was obtained in a yield of 70%.

We claim:

1. In the process for the manufacture of 1,2-dicyanocyclobutane by thermal dimerization of acrylonitrile, wherein acrylonitrile is heated for a period of between about 1 to 6 hours under about 10–100 atmospheres pressure of an inert gas selected from the group consisting of nitrogen, hydrogen and argon, at a temperature of between about 180° and 260° C. in the presence of a catalyst in an amount of between about 0.01 and 1.00% by weight, calculated on the acrylonitrile, and the reaction mixture is worked up by distillation, the improvement which comprises carrying out the dimerization in the presence of a catalyst selected from the group consisting of hydrogen sulfide, dodecylmercaptan, β,β'-dicyanodiethylsulfide, NiS, $WS_2$, CoS, FeS, BaS, ZnS, dimethylsulfide thioacetamide and allyl isothiocyanate.

2. The process of claim 1 wherein a pressure of about 20 to 50 atmospheres and a temperature of about 230° C. to 250° C. are maintained.

3. The process of claim 1, wherein the sulfur compounds are added in an amount of between about 0.05 and 0.1% by weight.

No references cited.

UNITED STATES PATENT OFFICE
CERTIFICATE OF CORRECTION

Patent No. 3,099,680            July 30, 1963

Kurt Sennewald et al.

It is hereby certified that error appears in the above numbered patent requiring correction and that the said Letters Patent should read as corrected below.

Column 3, line 22, for "MaS" read -- BaS --.

Signed and sealed this 25th day of February 1964.

(SEAL)
Attest:
ERNEST W. SWIDER

Attesting Officer

EDWIN L. REYNOLDS
Acting Commissioner of Patents